United States Patent
Hollstegge et al.

(10) Patent No.: US 11,155,079 B2
(45) Date of Patent: Oct. 26, 2021

(54) DATA-DRIVEN AND CUSTOMIZED PREDICTIVE RESOURCE REPLENISHMENT

(71) Applicant: IT XCEL Consulting, LLC, West Chester, OH (US)

(72) Inventors: Dennis William Hollstegge, Mason, OH (US); Matthew Charles Langworthy, Liberty Township, OH (US); Konrad Omeltschenko, Covington, KY (US); Michael Edward Janosik, Cincinnati, OH (US)

(73) Assignee: IT XCEL Consulting, LLC, West Chester, OH (US)

( * ) Notice: Subject to any disclaimer, the term of this patent is extended or adjusted under 35 U.S.C. 154(b) by 0 days.

(21) Appl. No.: 16/787,302

(22) Filed: Feb. 11, 2020

(65) Prior Publication Data
US 2021/0245500 A1   Aug. 12, 2021

(51) Int. Cl.
*B41J 2/045* (2006.01)
*G06Q 10/08* (2012.01)
*B41J 29/38* (2006.01)
*B41J 2/175* (2006.01)

(52) U.S. Cl.
CPC ........ *B41J 2/04536* (2013.01); *B41J 2/0451* (2013.01); *B41J 2/04513* (2013.01); *B41J 2/17546* (2013.01); *B41J 29/38* (2013.01); *G06Q 10/087* (2013.01)

(58) Field of Classification Search
CPC .................... B41J 2/17566; B41J 2002/17569
See application file for complete search history.

(56) References Cited

U.S. PATENT DOCUMENTS

| | | | |
|---|---|---|---|
| 10,402,295 B1 * | 9/2019 | Beiriger | G06F 11/3013 |
| 2020/0210126 A1 * | 7/2020 | Miyazawa | G06Q 30/06 |

FOREIGN PATENT DOCUMENTS

JP          2003015477 A  *  1/2003

* cited by examiner

*Primary Examiner* — Julian D Huffman
(74) *Attorney, Agent, or Firm* — Schwegman Lundberg & Woessner, P.A.

(57) ABSTRACT

Current usage metrics are maintained for a consumable of a resource. A history of usage metrics associated with consumable and other consumables used by the resource are acquired for the resource. A predicted date for which the consumable will need a replacement consumable is predicted based on one or more of the current usage metrics and the history of usage metrics. The replacement consumable is ordered on a second date that precedes the predicted date ensuring that the replacement consumable arrives at a site where the resource is located before the predicted date.

9 Claims, 4 Drawing Sheets

DATA-DRIVEN AND CUSTOMIZED PREDICTIVE RESOURCE REPLENISHMENT

BACKGROUND

A variety of devices utilized by consumers and businesses rely on consumables that require replenishment to fully utilize those devices. A good example of such a device is a printer. A printer includes a variety of consumables that are exhausted based on use of the printer, such as: paper, ink or toner, laser cartridges, ribbons, drums, fusers, and others. Some printers even include integrated functionality that use other consumables, such as adhesive, staples, and the like.

Larger businesses may require hundreds or thousands of printers. Maintaining the printers is costly and typically requires dedicated staff onsite where a given printer is located. As a result, many business have set up business relationships with manufacturers or distributers of printers to pay for these outside organizations to provide the printers, the needed consumables, and the printer support/replacement when needed. A business can handle, with little disruption or expense to the business, replacing consumables when required as this is a menial task requiring little effort or time by personnel.

However, knowing when consumables need to be ordered to ensure that the printers are fully functioning is not something that businesses want to be responsible for because personnel may forget or may not recognize that a consumable needs ordered and as a result, a given printer may not be fully operational when needed by a business. As a result, some business have completely outsourced even the ordering of consumables to the printer manufacturers or distributers.

Most printers include a software log mechanism that records a current remaining usable life of the consumables on the printers. The current usable lives of the consumables are obtained from the printers over a network connection and third parties monitor levels associated with the usable lives to determine when consumables should be ordered and shipped to the businesses.

The problem with this scenario, is that most printers stop recording the remaining usable life of a consumable when a predefined threshold is reached, such as 20% remaining. As a result, once this threshold is reached a consumable is ordered for the business and shipped, but each business and/or each printer within a specific business may have different levels of use and patterns of use, such that ordering and shipping a consumable is unnecessary and costly to the manufacturer or distributer. Conversely, some businesses may have a heavy use pattern, such that when 20% remaining on a usable life of a consumable is reached, the ordered and shipped consumable may not reach the business before the consumable is already depleted and the printer is already non-operational or out of service.

Therefore, there is a need for improved mechanisms by which consumable replenishment is processed that accounts for the actual resource usage patterns and characteristics or each resource that uses a consumable.

SUMMARY

In various embodiments, methods and a system for data-driven and customized predictive resource replenishment are presented.

According to an aspect, a method for data-driven and customized predictive resource replenishment is presented. Specifically, and in one aspect presented herein, a current set of usage metrics that is associated with a consumable of a resource is obtained. A history of usage metrics is acquired for the resource. A predicted date in which a replacement consumable will be needed to replace the consumable within the resource is predicted based on the current set of usage metrics and the history of usage metrics. The replacement consumable is ordered for delivery to a site associated with the resource on a second date that precedes the predicted date.

DETAILED DESCRIPTION

Figure 1:
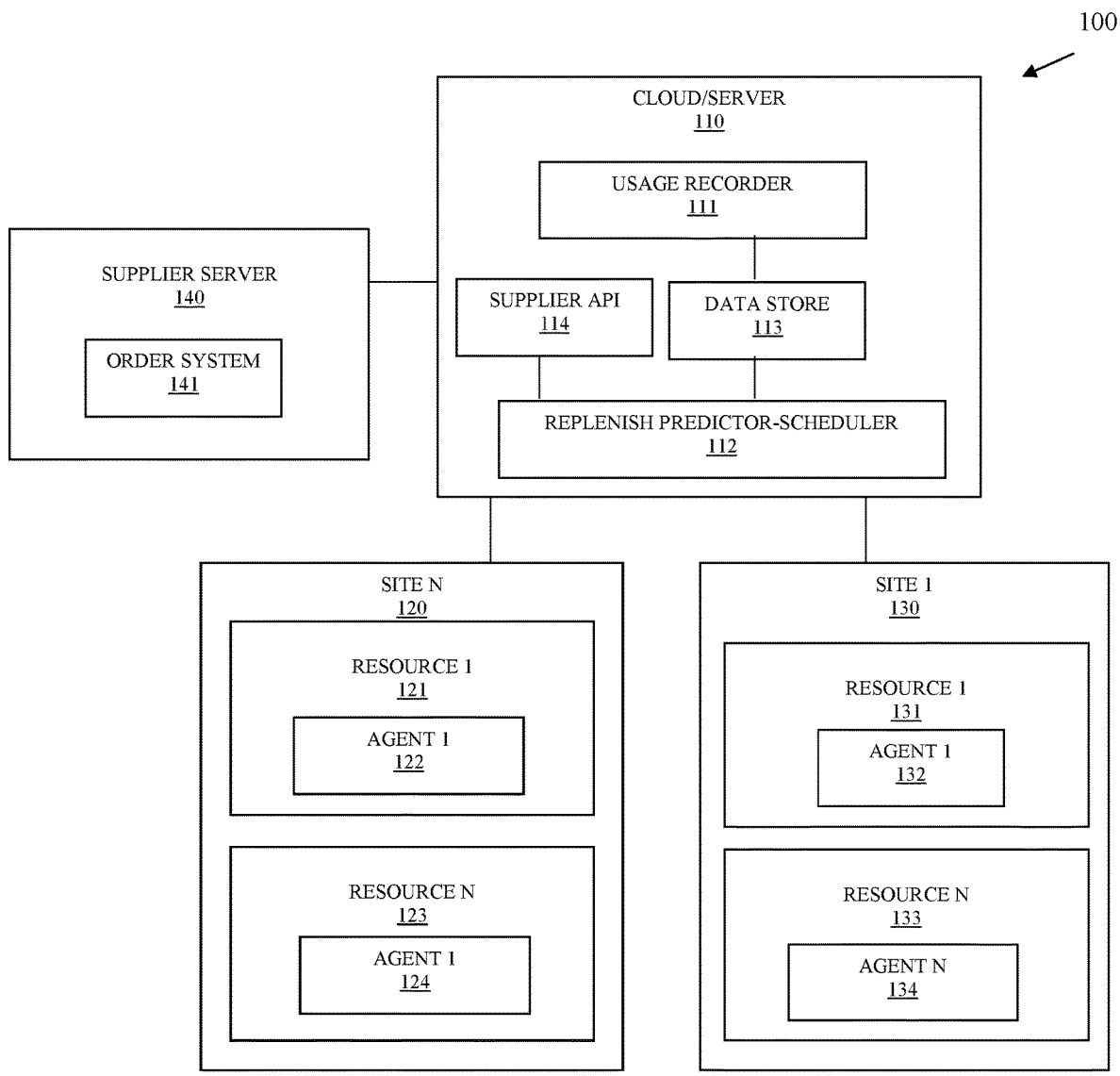
FIG. 1 is a diagram of a system for data-driven and customized predictive resource replenishment, according to an example embodiment.

FIG. 1 is a diagram of a system 100 for data-driven and customized predictive resource replenishment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of data-driven and customized predictive resource replenishment presented herein and below.

The system 100 provides mechanisms by which a consumable can be ordered and shipped for replenishment within a given resource based on a predication that is calculated. The calculated prediction accounts for such things as (by way of example only): a given type of consumable associated with a given resource that consumes that type of consumable, usage patterns of the consumable for the given resource, current obtained usage levels of a current consumable in use the given resource, a history of usage for the given type of consumable by the given resource, and any scheduled or anticipated replacement associated with the given resource.

As used herein, a "resource" is intended to mean a device having a processor, a non-transitory computer-readable storage medium, and memory. The "resource" consumes a consumable during operation of the resource. The resource may be an integrated peripheral to another type of computing device, such as a receipt printer of a transaction terminal (a Self-Service Terminal (SST), a kiosk, and/or a Point-Of-Sale (POS) terminal), an Automated Teller Machine (ATM), Self-Service Checkout (SSCO) terminals for groceries or other types of retailers, and/or mobile terminals or tablets (for example, rental car mobile terminals, etc.). The resource may also be a standalone and independent device, such as a network printer interfaced through a wired connection, a wireless connection, and/or a combination of wired and wireless connection to one or more computing devices.

"Consumables" can include components of a resource that are depleted and require replenishment/replacement for full functionality of the resource. Some example consumables can include toner, ink, laser cartridges, printer fusers, printer drums, printer waste toner, printer roller kit, printer document feeder, printer belts, printer maintenance kits, printer ribbons, staples, adhesive, and the like.

The system 100 includes a cloud/server 110, a plurality of remote network-based sites 120 and 130, and a supplier server 140.

Cloud/server 110 includes one server, or a collection of servers logically cooperating and organized as a single server within a cloud or cloud-based processing environment. Cloud/server 110 includes at least one hardware processing and non-transitory computer-readable storage media comprising executable instructions representing usage recorder 111, replenish predictor-scheduler 112, and supplier Application Programming Interface (API) 114. Cloud/server 110 also includes data store 113 accessible to usage recorder 111, replenish predictor-scheduler 112, and supplier API 114 (hereinafter just "API 114").

Each site 1 120 and site N 130 includes a plurality of resources 121, 123, 131, and 133, respectively. It is to be noted that a site 120 or 130 may include a single resource or more than two resources. It is also noted that there may be just a single site 120 or 130. Each site 120 or 130 represents a remote network location that is external to and geographically dispersed from cloud/server 110.

Each resource (121, 123, 131, and 134) includes at least one hardware processor and a non-transitory computer-readable storage medium comprising executable instructions representing a particular one of the agents (122, 124, 132, or 134).

During operation of system 100, as a given consumable is used on its corresponding resource (121, 123, 131, or 134), the percentage of that consumable that remains for use is captured by the corresponding agent (122, 124, 132, or 134) as well of other metrics associated with the consumable or other consumables for the corresponding resource (121, 123, 131, or 134). Each resource (121, 123, 131, or 134) can include a plurality of different consumables. The metrics can include a variety of usage information, such as pages printed, page coverage per page (percentage of a given page covered with ink or toner (a type of consumable), color percentage used for each page coverage, current running total of pages printed, total pages printed for a given print job, calendar date of a given print job, time of day for the given print job, type and size of paper used for a given print job, percent of remaining life of each consumable following a completed print job, quality of a given print job, and others.

As used herein "print job" may be used synonymously with "copy job" or "facsimile job." That is, any activity on the resources (121, 123, 131, and/or 134) that utilizes the consumables have metrics captured by the agents (122, 124, 132, and/or 134). However, in an embodiment, the agents (122, 124, 132, and/or 134) can record a type of job that initiated usage of the consumables to distinguish between print-initiated jobs, copy-initiated jobs, and facsimiles received on the corresponding resource/printer (121, 123, 131, or 134).

At predefined intervals of time, usage recorder 111 queries agents (122, 124, 132, and 134) to obtain the metrics recorded since usage recorder last-requested the metrics. The predefined interval of time can be user-defined and provided as a processing parameter to usage recorder, such as every hour, every few hours, once a day, etc. Each agent (122, 124, 132, and 134) reports a resource identifier for the resource (121, 123, 131, or 134) that it is processing on. The resource identifier permits usage recorder 111 to index and store the received metrics into data store 113.

The resource identifier may also be associated with a variety of information associated with its resource (121, 123, 131, or 134), such as device/resource name, manufacturer-issued serial number, Media Access Control (MAC) address, Internet Protocol (IP) address. Usage recorder 111 maintains a collection of records or a single record for each resource identifier comprising the identifying information discussed above as well as other information that may be updated by usage recorder 111 after receiving a set of reported metrics from the corresponding agent (122, 124, 132, or 134). This other information may include a total current life count of the number of pages printed by the resource (121, 123, 131, or 134) associated with the resource identifier broken down further for counts associated with total copies, total used linear feet (when the consumable is a thermal transfer ribbon and the resource is a thermal printer), totals for each paper size used, total color print jobs versus total mono print jobs, current remaining levels for each of the consumables (some consumables may be expressed in terms of page counts, such as maintenance kit, waste toner, etc.), consumable identifiers associated with each current consumable identified as being present in the resource (121, 123, 131, or 134). Information associated with each consumable identifier may also be stored with the resource identifier or linked via the consumable identifier to information about that type of consumable, such as type of consumable, capacity of the consumable, yield of the consumable, average expected page coverage assumed with the yield, etc.

Each resource identifier in the data store 113 may also be linked to a customer database via a customer number/account, such that each resource (121, 123, 131, or 134) is identified with a specific address of a specific customer. In fact, the location of a given resource (121, 123, 131, or 134) can be further broken down to a specific room or floor of a building at a given address.

Usage recorder 111 is also responsible for maintaining and updating each record or set of records associated with each resource identifier based on the metrics requested and retrieved by the corresponding agents (122, 124, 132, and 134) at the current predefined intervals. The raw reported metrics for each resource identifier may also be stored as a resource usage history and included within the data store or retrieved via a link from a different data store or file using the resource identifier for the given resource ((121, 123, 131, or 134).

Replenish predictor-scheduler 112 processes the history of metrics for each given resource (121, 123, 131, and 134) and processes the current updated metric totals from data store 113 to predict when a given consumable should be ordered and scheduled for delivery to the appropriate site 120 or 130 utilizing API 114 to interact with order system 141 of supplier server 140.

To achieve this, replenish predictor-scheduler 112 maintains a current usage profile for each resource (121, 123, 131, and 133). The current usage profile determines an average page coverage for pages printed by the corresponding resource (121, 123, 131, or 133), average pages printed within a given month, within a given week, within a given day of week, given time of day, etc. These averages are continuously updated based on metrics received and processed by usage recorder 111, such that the averages are never stale or out of date. A resource-specific coverage rate is also maintained within the usage profile.

Furthermore, although agents (122, 124, 132, and 134) stop reporting a remaining usage level for consumables when a threshold is reached, such as 20%, replenish predictor-scheduler 112 may continue to track the remaining usage level based on the specific consumable's known yield assuming a manufacture-suggested coverage rate and the calculated resource-specific rate. When the average pages per week using the resource-specific coverage rate, indicate that the consumable for a given resource (121, 123, 131, or 134) is going to deplete the consumable, replenish predictor-scheduler 112 may begin tracking remaining usage levels of the consumable on a daily basis.

Based on a preconfigured time lag that is known to be associated with placing orders using API 114 for replacement consumables with order system 141 and actual delivery of the replacement consumables to the sites 120 and 130, replenish predictor-scheduler 112 determines an optimal date upon which to place a replacement consumable order for a given resource (121, 123, 131, or 133) should be placed. This is based on the tracked remaining usage level for the consumable, expected yield of the consumable using the assumed page coverage rate, the resource-specific page coverage rate, and the average number of printed pages for the resource (121, 124, 131, or 133) within a given period of time (accounting for the preconfigured time lag).

Note that because replenish predictor-scheduler 112 does not rely solely on the lowest available and reported remaining usage level of the consumable (as recorded and obtained from agents (122, 124, 132, and 134), replenish predictor-scheduler 112 may place an order through API 114 with order system 141 before the lowest available remaining usage level is recorded when a customer associated with a given resource (121, 123, 131, or 134) has a higher than average resource-specific page coverage rate and average number of pages printed per day. Replenish predictor-scheduler 112 may also not place an order for a replacement consumable for an extended period of time for a customer associated with a low resource-specific page coverage rate and a low average number of pages printed per day even when the lowest remaining usage level for the consumable is being report In fact, replenish predictor-scheduler 112 places replacement consumable orders using API 114 with order system 141 at an optimal time that is data driven and customized for each resource (121, 123, 131, and 134) based on how each resource (121, 123, 131, and 134) is actually using/consuming the consumable. This prevents waste of the consumables, allows the supplier to only send consumables when needed by customers, and improves customer satisfaction with the supplier, since the customer is unlikely to experience a fully expended consumable before receiving a replacement consumable with system 100.

In an embodiment, replenish predictor-scheduler 112 may also be configured to evaluate additional user-defined conditions when determining when and how to place an order for a consumable of a given resource (121, 123, 131, or 134). For example, suppose a manufacturer is replacing a later-model resource (121, 123, 131, or 134) on a known date and that known date is after by a few days a date in which it is determined that the later-model resource resource (121, 123, 131, or 134) will require a consumable replacement. In such a case, replenish predictor-scheduler 112 may order a lower volume consumable replacement having a volume that the resource (121, 123, 131, or 134) is expected to need before receiving the replacement resource (121, 123, 131, or 134). As such, the user-defined conditions can be used to create further efficiencies associated with consumables by reducing waste and expenses.

In an embodiment, replenish predictor-scheduler 112 is a trained machine-learning algorithm that is trained on each resource (121, 123, 131, 134) and that resource's metrics along with the actual order dates made for replacement consumables. The trained machine-learning algorithm when provided a current set of metrics for a given resource (121, 123, 131, or 134) outputs a date upon which a given replacement consumable for the given resource (121, 123, 131, or 133) should be ordered.

In an embodiment, replenish predictor-scheduler 112 reports specific resource page coverage rates for resources (121, 123, 131, and 133) associated with a specific customer account/number to order system 141 using API 114 when requested or periodically at preconfigured intervals of time or when a specific resource page cover rate exceeds a predefined expected threshold. Often manufacturers, distributors, or suppliers base per-page-printed pricing rates for customers based on a projected page coverage rate, such that reporting the specific resource page coverage rates for a given customer would allow these organizations to adjust pricing based on actual consumable consumption rates. It is noted that the pricing does not always have to result in an increase in per-page-printed pricing rates as lower than expected specific resource page cover rates can also be used by the manufacturers, distributors, or suppliers to decrease a given customer's pricing rates. Furthermore, although not shown the replenish predictor-scheduler 112 may using a different API to report the page coverage rates to the manufacture or distributor as the supplier that supplies the consumables may not be the actual manufacture or distributer that owns and maintains the resources (121, 123, 131, and 133).

In an embodiment of the last embodiment, the replenish predictor-scheduler 112 may average all of the resource-specific page coverage rates associated with resources (121, 123, 131, and 133) of a given customer to report a single page coverage rate per unique customer to the manufacture or distributer.

In an embodiment, agents (122, 124, 132, and 134) are configured to push or self-report the metrics to usage recorder 111.

In an embodiment, agents (122, 124, 132, and 134) are unnecessary; in such embodiments, usage recorder 111 retrieves the metrics at the predefined intervals from logs maintained by the resources (121, 123, 131, and 133). The logs can reside on the resources (121, 123, 131, and 133) or reside on a different network location accessible to usage recorder 111.

In an embodiment, usage recorder 111 calculates some of the metrics based on the type of consumable and type of resource. That is, some metrics can be derived by usage recorder 111 based on reported metrics.

System 100 permits a variety of different situations for which a prediction can be made as to when a given consumable of a resource (121, 123, 131, or 134) requires replenishment with a replacement consumable before the consumable actually requires replacement by a consumer associated with a resource.

In a first scenario, predictive orders for consumables are processed based on historical usage habits associated with the consumables of a given resource (121, 123, 131, or 134). The average printed pages/labels or depletion rates of the consumable per day is calculated from the historical usage metrics maintained from the data store 113. Each day or at configured intervals of time during each day, the average printed/depletion rate per day is re-calculated based on the current metrics available for the resource (121, 123, 131, or 134). The average per day usage/depletion rate is used with a current date (date upon which the re-calculation is processed) to determine how many days from the current date before the consumable is estimated to be completely depleted and requires replacement. The known number of days associated with preparing, shipping, and delivering a replacement consumable is also factored in and a predicted order date is calculated.

In a second scenario, predictive percentage-based orders for consumables are processed based on a threshold that is set for the consumables. When a current remaining percentage of the consumable equals or falls below the set threshold, the supplier API 114 is used for placing a replacement consumable order with order system 141. The threshold can be calculated and customized based on the type of consumable and resource (121, 123, 131, or 134) as used by a given customer associated with that resource (121, 123, 131, or 134).

In a third scenario, page-based predictive orders for consumables are processed based on an expected life for a given consumable. In this case, the consumable may be a maintenance component associated with the corresponding resource (121, 123, 131, or 134). For example, a total number of pages printed since a known install date of the consumable is subtracted from an expected life page count assigned to the consumable to obtain a result. The result is then divided by the total number of days that the consumable was used by the resource (121, 123, 131, or 134) using an install date of the consumable to obtain an average daily usage page count. Using the current date, the daily usage page count, the expected life page count, and the current usage page count, a predicated date is determined upon which the consumable will need replacement. The shipping/order preparation delay time may also be factored in when determining the predicated date. On the predicated date, API 114 is processed to place an order for the consumable with order system 141.

In a fourth scenario, dynamic predictive orders are processed, which determines what type of yield associated with an ordered replacement consumable should be selected when a predictive order is placed for the consumable. That is, the consumable may be associated with multiple different yield replacement consumables (e.g., 10,000-page yield, 20,000-page yield, 30,000-page yield, and a 50,000-page yield). A total expected annual usage for consumables (of the same type as the consumable being ordered) of the resource (121, 123, 131, or 134) is calculated from the usage metrics of data store 113. A closest-yielding replacement consumable to the total expected annual usage is selected without going over the total expected annual usage. Other conditions may be used as well; for example, if the resource (121, 123, 131, or 134) is associated with an expected end-of-service date that is less than 1 year, that date may be used in connection with the average daily usage rate to select a replacement consumable having a yield closest to matching the expected and needed yield for the resource (121, 123, 131, or 134) before the resource (121, 123, 131, or 134) is replaced and taken out of service on the end-of-service date. This ensures that a yield amount needed in the replacement consumable matches what the resource (121, 123, 131, or 134) will actually need, such that waste is minimized.

In a fifth scenario, the consumable includes a ribbon of a defined length in feet/meters (a specific unit of length). Usage metrics in data store 113 include current used length of the ribbon and the known length of the ribbon when unused and installed on the resource (121, 123, 131, or 134). Predictions can be based on average daily usage of the consumable (ribbon) in a unit of length, (such as feet/meters, inches/centimeters, etc.) the known length of the consumable, current used length of the consumable, and the current date are processed to calculate the predictive order. In an embodiment, the consumable is a thermal transfer ribbon and the resource (121, 123, 131, or 134) is a thermal printer. In an embodiment, the type of label (such as a thermal label) and size (dimensions) of the label are also used in combination with the metrics on the unit of length for the consumable to predict the order date for the consumable (thermal-transfer ribbon).

The above-noted embodiments and other embodiments are now discussed with reference to FIGS. 2-4.

Figure 2:
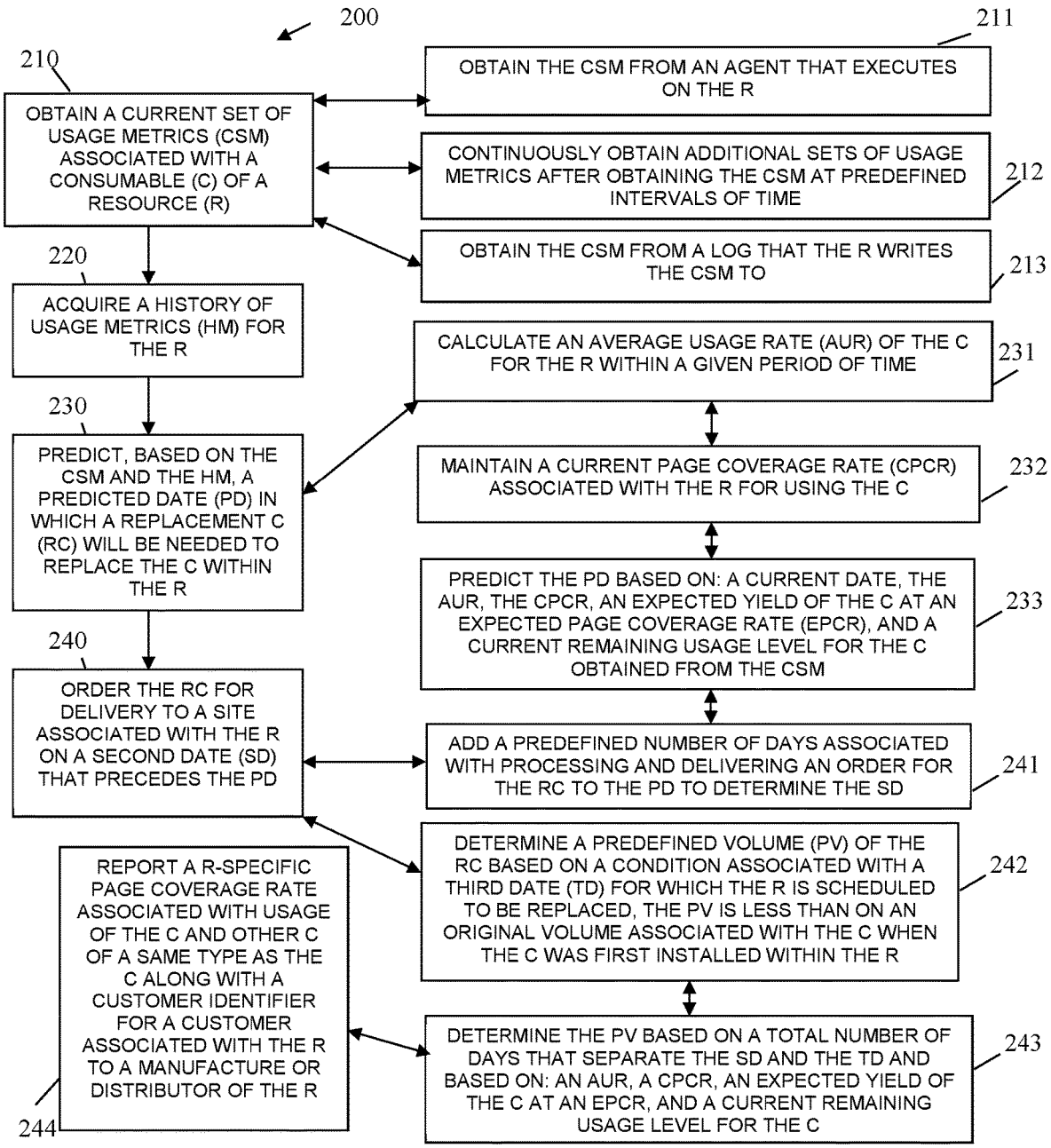
FIG. 2 is a diagram of a method for data-driven and customized predictive resource replenishment, according to an example embodiment.

FIG. 2 is a diagram of a method 200 for data-driven and customized predictive resource replenishment, according to an example embodiment. The software module(s) that implements the method 200 is referred to as a "consumable replenishment predictor." The consumable replenishment predictor is implemented as executable instructions programmed and residing within memory and/or a non-transitory computer-readable (processor-readable) storage medium and executed by one or more processors of a device. The processor(s) of the device that executes the consumable replenishment predictor are specifically configured and programmed to process the consumable replenishment predictor. The consumable replenishment predictor has access to one or more network connections during its processing. The network connections can be wired, wireless, or a combination of wired and wireless.

In an embodiment, the device that executes the consumable replenishment predictor is cloud/server 110. In an embodiment, the server is a cloud processing environment that comprises multiple servers cooperating with one another as a single server. In an embodiment, the server is a Wide Area Network (WAN) server.

In an embodiment, the consumable replenishment predictor is all of or some combination of 111-114.

At 210, the consumable replenishment predictor obtains a current set of usage metrics associated with a consumable of a resource. In an embodiment, the resource is a printer. In an embodiment, the consumable is one of: a toner cartridge, an ink cartridge, a laser cartridge, a printer fuser, a printer drum, a printer waste toner, a printer roller kit, a printer document feeder, a printer belt, a printer maintenance kit, a printer ribbon, staples, or an adhesive.

In an embodiment, at 211, the consumable replenishment predictor obtains the current set of usage metrics from an agent that executes on the resource. In an embodiment, the agent is one of: 122, 124, 132, or 134.

In an embodiment, at 212, the consumable replenishment predictor continuously obtains additional sets of usage metrics after obtaining the current set of usage metrics at predefined and configured intervals of time.

In an embodiment, at 213, the consumable replenishment predictor calculates an average usage rate of the consumable for the resource within a given period of time. In an embodiment, the given period of time is dynamically adjusted based on a remaining usage level associated with the consumable.

At 220, the consumable replenishment predictor acquires a history of usage metrics for the resource associated with the consumable and other previously consumed consumables of a same type as the consumable on the resource.

At 230, the consumable replenishment predictor predicts, based on the current set of usage metrics and the history of usage metrics, a predicted date in which a replacement consumable will be needed to replace the consumable within the resource.

In an embodiment, at 231, the consumable replenishment predictor calculates an average usage rate of the consumable for the resource within a given period of time.

In an embodiment of 231 and at 232, the consumable replenishment predictor maintains a current page coverage rate associated with the resource for using the consumable and other consumables of the same type that were previously consumed.

In an embodiment of 232 and at 233, the consumable replenishment predictor predicts the predicted date based on: a current date, the average usage rate, the current page coverage rate, an expected yield of the consumable based on the type of consumable and assuming an expected page coverage rate, and a current remaining usage level for the consumable obtained from the current set of usage metrics.

In an embodiment, the consumable replenishment predictor calculates the predicated date based on one, all, or any combination of the five scenarios discussed above with the FIG. 1 and system 100.

At 240, the consumable replenishment predictor orders the replacement consumable for delivery to a site associated with the resource on a second date that precedes the predicted date.

In an embodiment of 233 and 240, at 241, the consumable replenishment predictor adds a predefined number of days associated with processing and delivering an order for the replacement consumable to the predicted data to determine the second date.

In an embodiment, at 242, the consumable replenishment predictor determines a predefined volume of the replacement consumable based on a condition associated with a third date for which the resource is scheduled to be replaced. The predefined volume is less than an original volume associated with the consumable when the consumable was first installed within the resource.

In an embodiment of 242 and at 243, the consumable replenishment predictor determines the predefined volume based on a total number of days that separate the second date and the third date and based on: an average usage rate, a current page coverage rate, an expected yield of the consumable at an expected page coverage rate, and a current remaining usage level for the consumable.

In an embodiment of 243 and at 244, the consumable replenishment predictor reports a resource-specific page coverage rate associated with usage of the consumable and other consumables of a same type as the consumable along with a customer identifier for a customer associated with the resource to a manufacturer or a distributer of the resource.

Figure 3:
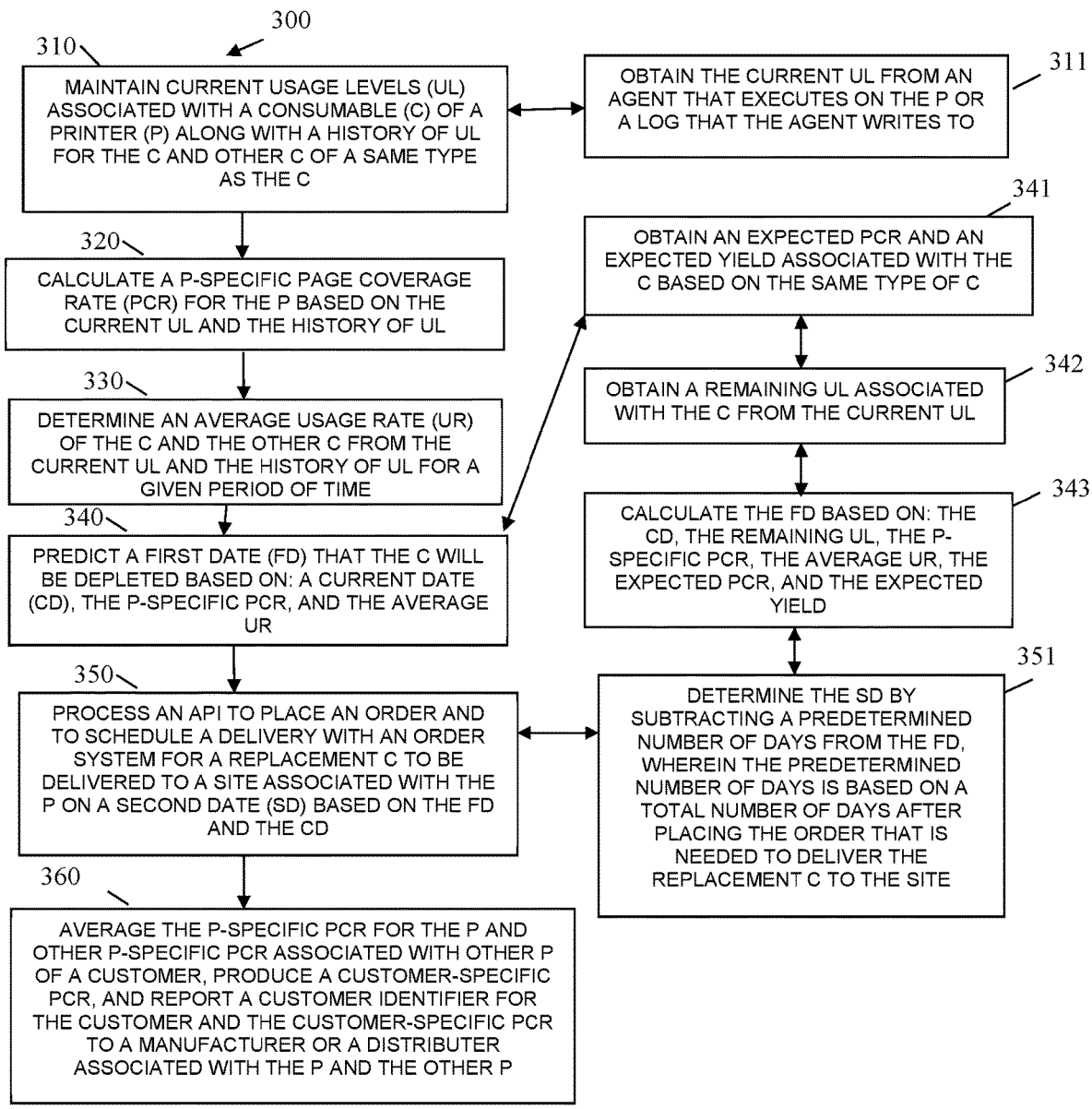
FIG. 3 is a diagram of another method for data-driven and customized predictive resource replenishment, according to an example embodiment.

FIG. 3 is a diagram of another method 300 for data-driven and customized predictive resource replenishment, according to an example embodiment. The software module(s) that implements the method 300 is referred to as a "consumable replenishment scheduler." The consumable replenishment scheduler is implemented as executable instructions programmed and residing within memory and/or a non-transitory computer-readable (processor-readable) storage medium and executed by one or more processors of a device. The processors that execute the consumable replenishment scheduler are specifically configured and programmed to process the consumable replenishment scheduler. The consumable replenishment scheduler has access to one or more network connections during its processing. The network connections can be wired, wireless, or a combination of wired and wireless.

In an embodiment, the device that executes the consumable replenishment scheduler is cloud/server 110. In an embodiment, the server is a cloud processing environment that comprises multiple servers cooperating with one another as a single server. In an embodiment, the server is a WAN server that is local to a retail store.

In an embodiment, the consumable replenishment scheduler is all or some combination of 111-114 and/or the method 200.

The consumable replenishment scheduler presents another and, in some ways, enhanced processing perspective to that which was described above with the FIG. 2.

At 310, the consumable replenishment scheduler maintains current usage levels associated with a consumable of a printer along with a history of usage levels for the consumable and other consumables of a same type as the consumable.

In an embodiment, at 311, the consumable replenishment scheduler obtains the current usage levels from an agent that executes on the printer or a log that the agent writes to.

At 320, the consumable replenishment scheduler calculates a printer-specific page coverage rate for the printer based on the current usage levels and the history of usage levels.

At 330, the consumable replenishment scheduler determines an average usage rate of the consumable and other consumables from the current usage levels and the history of usage levels for a given period of time.

At 340, the consumable replenishment scheduler predicts a first date that the consumable will be depleted based on: a current date, the printer-specific page coverage rate, and the average usage rates.

In an embodiment, at 341, the consumable replenishment scheduler obtains the expected page coverage rate and an expected yield associated with the consumable based on the same type associated with the consumable.

In an embodiment of 341 and at 342, the consumable replenishment scheduler obtains a remaining usage level associated with the consumable from the current usage levels.

In an embodiment of 342 and at 343, the consumable replenishment scheduler calculates the first date based on: the current date, the remaining usage levels, the printer-specific page coverage rate, the average usage rate, the expected page coverage rate, and the expected yield based on the expected page coverage rate.

At 350, the consumable replenishment scheduler processes an API to place an order and to schedule a delivery with an order system for a replacement consumable to be delivered to a site associated with the printer on a second date based on the first date and the current date.

In an embodiment of 343 and 350, at 351, the consumable replenishment scheduler determines the second date by subtracting a predetermined number of days from the first date. The predetermined number of days is based on a total number of days after placing the order that is needed to deliver the replacement consumable to the site.

According to an embodiment, at 360, the consumable replenishment scheduler averages the printer-specific page coverage rate for the printer and other printer-specific page coverage rates associated with other printers of a customer. The consumable replenishment scheduler produces a customer-specific page coverage rate and reports a customer identifier for the customer and the customer-specific page coverage rate to a manufacturer or a distributer associated with the printer and the other printers.

Figure 4:
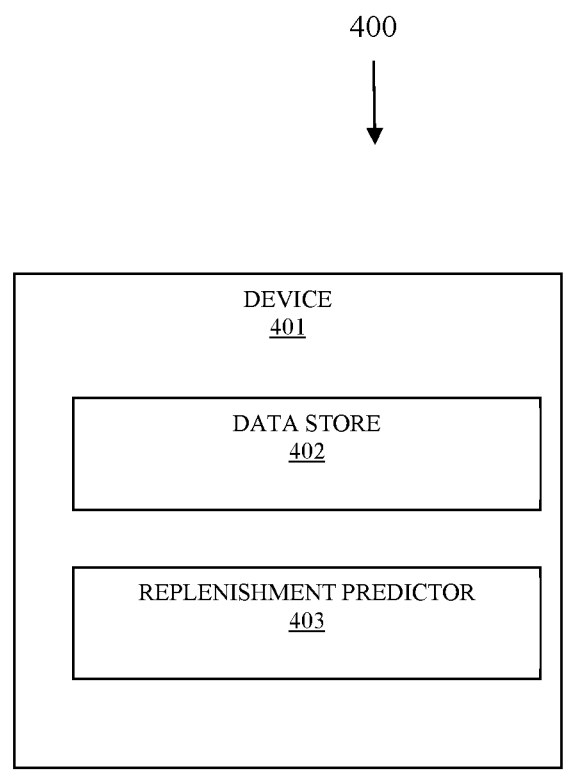
FIG. 4 is a diagram of another system for data-driven and customized predictive resource replenishment, according to an example embodiment.

FIG. 4 is a diagram of a system 400 for data-driven and customized predictive resource replenishment, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a processing device 401, a data store 402, and a replenishment predictor 403.

In an embodiment, the processing device 401 is a server. In an embodiment, the server is cloud/server 110. In an embodiment, the server is a collection of servers that cooperate as a cloud processing environment. In an embodiment, the server is a WAN-based server.

The replenishment predictor 403 is a set of executable instructions that is executed on one or more hardware processors of the processing device 401 from a non-transitory computer-readable storage medium or memory.

The data store 402 is a database and/or a file accessible to the processing environment of the replenishment predictor 403.

The replenishment predictor 403, when executed by the processor(s) of the device 401, is configured to cause the processor to perform processing comprising: 1) obtaining current usage levels of a consumable associated with a printer; 2) calculating average usage rates associated with consuming the consumable and other consumables of a same type as the consumable on the printer; 3) calculating a printer-specific page coverage rate associated with consuming the consumable and the other consumables on the printer; 4) predicting a first date for which the consumable will be depleted on the printer based on: a current date, the current usage levels, the average usage rates, the printer-specific page coverage rate, an expected page coverage rate for the consumable, and an expected yield associated with the consumable; and 5) ordering a replacement consumable to be delivered to a site having the printer on a second date that precedes the first date and that accounts for a length of time in days for which the replacement consumable requires to be delivered to the site.

In an embodiment, the replenishment predictor 403 is all or some combination of: 111, 112, 114, method 200, and/or method 300.

In an embodiment, the consumable is one of: a toner cartridge, an ink cartridge, a laser cartridge, a printer fuser, a printer drum, a printer waste toner, a printer roller kit, a printer document feeder, a printer belt, a printer maintenance kit, a printer ribbon, staples, or an adhesive.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    maintaining current usage levels associated with a consumable of a printer along with a history of usage levels for the consumable and other consumables of a same type as the consumable;
    calculating a printer-specific page coverage rate for the printer based on the current usage levels and the history of usage levels;
    determining an average usage rate of the consumable and the other consumables from the current usage levels and the history of usage levels for a given period of time;
    predicting a first date that the consumable will be depleted based on: a current date, the printer-specific page coverage rate, and the average usage rate; and
    processing an Application Programming Interface (API) to place an order and to schedule a delivery with an order system for a replacement consumable to be delivered to a site associated with the printer on a second date based on the first date and the current date.

2. The method of claim 1, obtain the current usage levels from an agent that executes on the printer or a log that the agent writes to.

3. The method of claim 1, wherein predicting further includes obtaining an expected page coverage rate and an expected yield associated with the consumable based on the same type of consumable.

4. The method of claim 3, wherein obtaining further includes obtaining a remaining usage level associated with the consumable from the current usage levels.

5. The method of claim 4, wherein obtaining further includes calculating the first date based on: the current date, the remaining usage level, the printer-specific page coverage rate, the average usage rate, the expected page coverage rate, and the expected yield.

6. The method of claim 5, wherein processing further includes determining the second date by subtracting a predetermined number of days from the first date, wherein the predetermined number of days is based on a total number of days after placing the order that is needed to deliver the replacement consumable to the site.

7. The method of claim 1 further comprising, averaging the printer-specific page coverage rate for the printer with other printer-specific page coverage rates associated with other printers of a customer, producing a customer-specific page coverage rate, and reporting a customer identifier for the customer and the customer-specific page coverage rate to a manufacture or a distributer associated with the printer and the other printers.

8. A system, comprising:

a processing device having at least one processor configured to execute instructions from a non-transitory computer-readable storage medium, the instructions representing a replenishment predictor;

a data store; and the replenishment predictor when executed by the at least one processor causes the at least one processor to perform processing comprising:

obtaining current usage levels of a consumable associated with a printer;

calculating average usage rates associated with consuming the consumable and other consumables of a same type as the consumable on the printer;

calculating a printer-specific page coverage rate associated with consuming the consumable and the other consumables on the printer;

predicting a first date for which the consumable will be depleted on the printer based on: a current date, the current usage levels, the average usage rates, the printer-specific page coverage rate, an expected page coverage rate for the consumable, and an expected yield associated with the consumable; and ordering a replacement consumable to be delivered to a site having the printer on a second date that precedes the first date and that accounts for a length of time in days for which the replacement consumable requires to be delivered to the site.

9. The system of claim 8, wherein the consumable is one of: a toner cartridge, an ink cartridge, a laser cartridge, a printer fuser, a printer drum, a printer waste toner, a printer roller kit, a printer document feeder, a printer belt, a printer maintenance kit, a printer ribbon, staples, or an adhesive.

* * * * *